Aug. 15, 1967  B. D. BARBEE  3,335,498
CARPENTER'S MEASURING TOOL
Filed March 2, 1966
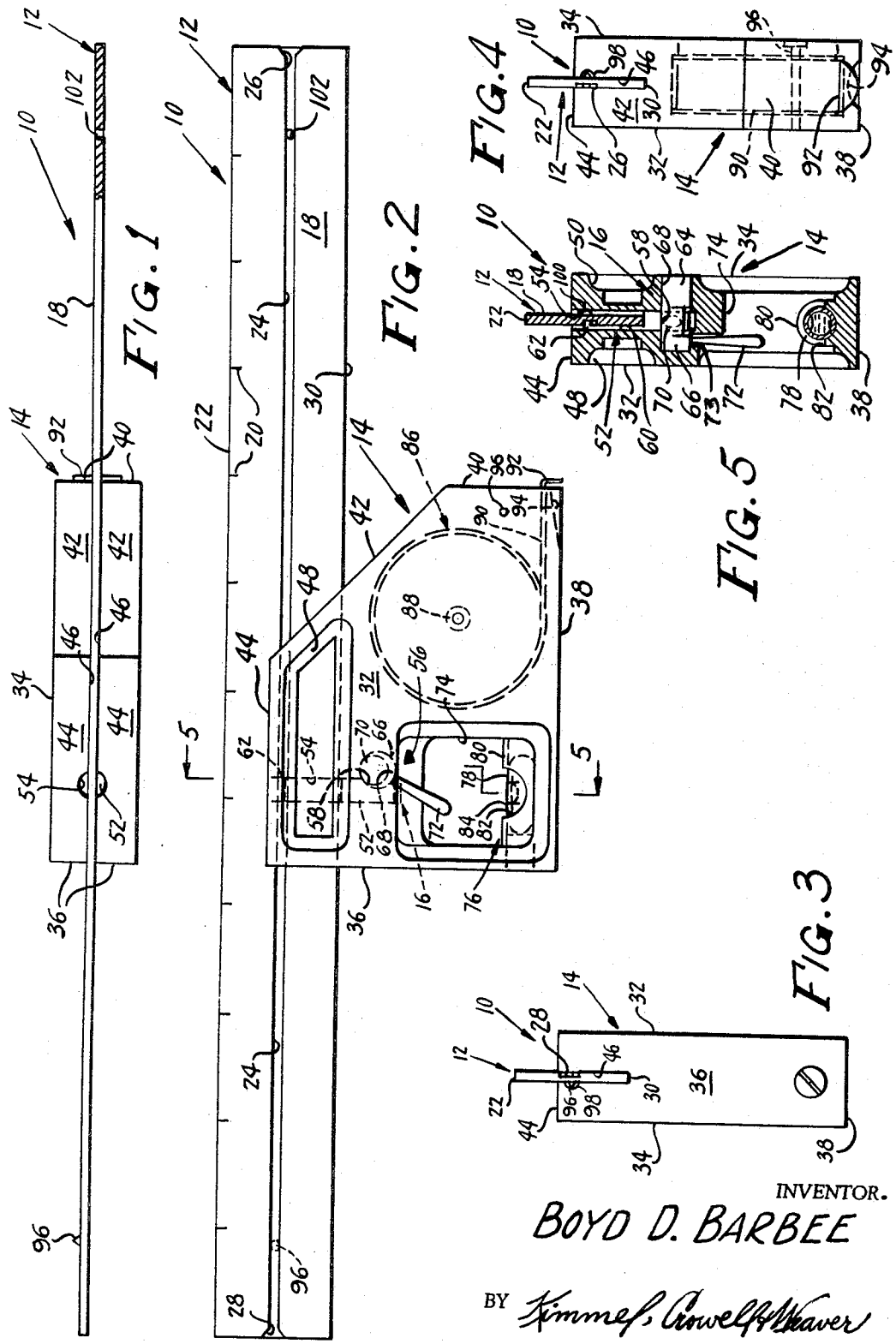
INVENTOR.
BOYD D. BARBEE
BY Kimmel, Crowell & Weaver
ATTORNEYS.

United States Patent Office 3,335,498
Patented Aug. 15, 1967

3,335,498
CARPENTER'S MEASURING TOOL
Boyd D. Barbee, 1941 63rd Ave.,
Sacramento, Calif. 95822
Filed Mar. 2, 1966, Ser. No. 531,306
6 Claims. (Cl. 33—95)

This invention relates to a carpenter's measuring tool of the type which may be utilized to perform a variety of functions, and more particularly to a measuring tool of T-square configuration in which the crossbar and the shank of the T-square are slidably interrelated with the shank being releasably attached at any point along the crossbar.

It is a primary object of the instant invention to provide a carpenter's measuring tool of T-square configuration in which the shank is movable along the crossbar to increase the effective length of the crossbar such that a perpendicular, longer than half the length of the crossbar, may be drawn.

Another object of the instant invention is to provide a new and novel releasable connecting means for selectively securing the shank to the crossbar at any location therealong.

Still another object of the instant invention is to provide a readily accessible handle for actuating the selective securing means with the terminus of the handle being positioned in an opening in the shank of the T-square, thereby avoiding injury to the handle from contact with another object.

A further object of the instant invention is to provide a level in conjunction with the shank of the T-square, the releasable securing means cooperating therewith to provide a balanced support since the crossbar may be balanced or removed.

A still further object of the instant invention is to provide a tape measure in conjunction with the shank of the T-square, the crossbar being provided with suitable measuring indicia with the tape measure cooperating therewith to provide a measuring extension of the ruler.

Still another object of the instant invention is to provide a protuberance on the ruler or crossbar to inscribe a mark in the material being worked on.

A further object of the instant invention is to provide an aperture in the ruler spaced from the protuberance such that the ruler may be used to inscribe a circle on the material being worked on.

Other objects and advantages of the instant invention reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a top plan view of a carpenter's measuring tool of the instant invention;

FIGURE 2 is a side elevational view of the measuring tool of FIGURE 1 emphasizing the T-square configuration thereof;

FIGURE 3 is a side elevational view of the measuring tool of FIGURES 1 and 2;

FIGURE 4 is another side view, opposite from that of FIGURE 3 of the measuring tool of FIGURES 1 to 3 inclusive; and FIGURE 5 is a transverse cross sectional view of the tool of FIGURE 2 taken substantially along line 5—5 thereof as viewed in the direction indicated by the arrows and illustrating the means for selectively securing the ruler to the housing.

Referring now to the drawing in detail, wherein like reference characters designate like elements throughout the several views thereof, there is indicated generally at 10 a carpenter's measuring tool made in accordance with the principles of the instant invention having as its major components an elongated substantially rectangular flat ruler shown generally at 12, a housing denoted generally at 14, and a connector shown generally at 16 for selectively securing housing 14 to ruler 12 at any point along the longitudinal dimension thereof.

As will be readily apparent, measuring tool 10 is in the configuration of a carpenter's T-square with ruler 12 constituting a crossbar thereof while housing 14 constitutes the shank.

Ruler 12 comprises an elongate straight planar strip 18, preferably of metal or hard plastic, having a plurality of measuring indicia 20 on outer longitudinal edge 22. A longitudinal groove 24 extends down the center of plate 18, the groove 24 extending axially of the ruler 12 and opening at its ends into a pair of flanged ends 26, 28 to facilitate the insertion of housing 14 onto ruler 12, as will be more fully explained hereinafter. The inner longitudinal edge 30 of ruler 12 is overlapped by the upper end of housing 14 to a point slightly beyond the transverse midpoint of strip 18.

In side elevation the housing 14 is an irregular pentagon having a front face 32, a parallel rear face 34, a side wall 36 perpendicular to front and rear faces 32, 34 and perpendicular to ruler 12 a bottom wall 38 perpendicular to a first side wall 36, a second side wall 40 parallel to first side wall 36, a diagonal wall 42 intersecting second side wall 40 at an obtuse angle and a top wall 44 also at an obtuse angle, the top wall 44 extending parallel to the bottom wall 38. Diagonal wall 42 and top wall 44 form a planar slot 46 in which ruler 12 is slidably mounted. It will be seen from FIGURE 3 that top wall 44 provides a perpendicular abutment such that ruler 12 may be placed parallel along a board or other flat member with upper longitudinal edge 22 being parallel with the edge which top wall 44 abuts.

From FIGURE 2 it will be seen that side wall 36 provides a perpendicular abutment, thus allowing a perpendicular to be drawn on the work, as when cutting a plank or sill. Since connector 16 allows housing 14 to be moved along the lengthwise dimension of ruler 12, it will be apparent that a perpendicular greater than half the length of ruler 12 may be inscribed on the work. To facilitate the sliding of shank 14 along crossbar 12, a pair of recesses 48, 50 are formed in front and rear faces 32, 34 as may best be seen in FIGURE 5. After connector 16 is manipulated to release engagement between ruler 12 and housing 14, the individual may place the fingers in recesses 48, 50 and grasp housing 14 between the palm and remaining fingers to slide it along the longitudinal dimension of strip 18.

Referring now to FIGURE 5, connector 16 includes a cylindrical rod shown generally at 52 mounted for up and down movement in a circular passageway 54 with a cam shown generally at 56 extending transversely with respect to rod 52 engaging the convex cutout 58 formed in the lower half of rod 52. Rod 52 also forms a vertical planar slot 60 slidably receiving ruler 12 therein with a lug 62 being disposed in groove 24. As will be more fully explained hereinafter, cam 56 will be manipulated to force rod 52 downwardly such that lug 62 firmly engages the upwardly facing surface of groove 24 to secure ruler 12 in housing 14.

Cam 56 includes a pair of spaced apart generally cylindrical bosses 64, 66 disposed in a cylindrical passageway 68 transverse to passageway 54 and a radially offset centrally disposed camming surface 70 in engagement with cutout 58. A handle 72 is affixed radially of cylindrical boss 66 and extends through a passage 73 into a central opening 74 formed in housing 14. It will be evident that the manipulation of handle 72 will rotate cam 56 with camming surface 70 acting to elevate and depress rod 52 thereby disengaging and engaging lug 62 with the upwardly facing surface of groove 24 to secure ruler 12 in housing 14.

Referring now to FIGURE 2, a level shown generally at 76 is positioned in central opening 74 and includes a cylindrical tube 78 positioned in a housing 80 forming an arcuate cutout 82 to expose a pair of centrally disposed spaced apart indicia 84. Tube 78 is filled with a convenient liquid to provide an air bubble in a conventional manner. Since tube 78 is parallel to bottom wall 38, it will be seen that housing 14 may be positioned on a surface to determine if it is level. It should be noted that level 76 cooperates with the adjustable features of ruler 12 and housing 14 such that measuring tool 10 is balanced, as when housing 14 is centrally positioned on ruler 12 as in FIGURE 2, to make tool 10 a balanced article thereby insuring an accurate measurement.

Another important feature of the instant invention resides in the provision of a measuring tape shown generally at 86 having an axle forming member 88 extending transversely between front and rear faces 32, 34 with a flat measuring tape 90 being wound about axle 88 in a conventional manner. The outer or free end of measuring tape 90 is formed with a substantially perpendicular retaining member 92 juxtaposed to side wall 40 to prevent tape 90 from being wholly retracted within housing 14. As may be seen in FIGURES 2 and 4, a depression 94 is formed in bottom wall 38 at the intersection with side wall 40 to allow an individual to readily grasp retaining member 92. It should be noted that when measuring tape 90 extends outwardly from housing 14, it acts to measure distances in the same direction as ruler 12 and accordingly cooperates therewith to measure distances longer than provided thereby.

Another important feature of the instant invention resides in the provision of a protuberance 96 on strip 18 extending away therefrom for inscribing a mark in the work. Protuberance 96 may be of the bullet-catch variety, which comprises a small ball bearing protruding from strip 18, but is illustrated as a small dimple made by placing a conventional welding rod on strip 18 to leave a small piece of metal adhering thereto after which a small tool is used to strike the metal to form the dimple illustrated. Protuberance 96 may be used for scribing a mark in deformable work, such as lumber or the like.

To illustrate the cooperation between protuberance 96 and the adjustable features of ruler 12 and housing 14, a simple illustration will suffice. The illustrative problem resides in the cutting of a board from a larger plank. It is desired that the board be of the same length as the plank but of narrower width. It is necessary only to release connector 16 and position housing 14 the desired distance from protuberance 96, corresponding to the desired width of the board. Measuring tool 10 may then be turned upside down with protuberance 96 contacting the work and with side wall 36 engaging the side of the plank from which the board is to be made. The individual will then move measuring tool 10 along the longitudinal dimension of the plank with protuberance 96 forming a mark on the work to indicate the path of the saw.

It should be noted that protuberance 96 is in the form of a hemisphere and accordingly is not so easily diverted when it comes in contact with a harder portion of the lumber such as often occurs when using an ordinary scriber. As may be seen in FIGURES 3 to 5, inclusive, housing 14 forms a groove 98 to allow passage of protuberance 96 therethrough. In addition, housing 14 is provided with a complementarily shaped groove 100 for similar purposes.

Another feature of the instant invention utilizable with protuberance 96 is an aperture 102 formed in strip 18 a given distance from protuberance 96 for allowing the scribing of a circle on the work. The individual preferably removes housing 14 from ruler 12 and turns metal strip 18 upside down such that protuberance 96 contacts the work. A nail or other suitable holder may be inserted through aperture 102 to contact the work and provides a pivot point about which metal strip 18 may be moved. It will be seen that the circular movement of metal strip 18 will cause protuberance 96 to contact the work and inscribe a circle thereon. It should be apparent that a plurality of spaced apertures, similar to aperture 102, may be placed along the longitudinal axis of ruler 12 to allow the scribing of circles of different sizes.

As indicated in FIGURE 4, a portion of rear face 34 is removably affixed to housing 14 to allow tape 86 to be replaced if it is damaged in any manner. This may be accomplished by removing threaded screw 96, removing the portion of face 34 and replacing tape 36 in a conventional manner.

It is now seen that there is herein provided an improved carpenter's measuring tool having all of the objects of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:
1. A carpenter's tool comprising:
   an elongated substantially flat ruler having indicia thereon for measuring linear distances, said ruler having a centrally located axially extending groove formed in a side thereof;
   a housing slidably mounted on said ruler for movement axially thereof, said housing comprising a polygonal element including first and second pairs of walls;
   said housing having an elongated first slot formed therein extending inwardly from one wall of said first pair of walls, said slot having opposed ends opening, respectively, into the walls of said second pair of walls;
   said housing having a pair of opposed faces and a transversely extending centrally located opening extending between and opening at its ends into said faces;
   said housing having a first passageway formed therein, said first passageway traversing said slot and having a pair of opposed ends with one end thereof opening into said one wall of said first pair of walls;
   an elongated rod mounted for reciprocation in said first passageway, said rod having a pair of opposed ends and a second slot extending inwardly from one end thereof and transversely therethrough, said first and second slots being aligned with one another and receiving said ruler therein for sliding axial movement thereof selectively in directions towards and away from the second pair of walls;
   said rod having a lug formed therein projecting inwardly of said slot, said rod being slidably received within and overhanging a side of said groove;
   said housing having a second passageway formed therein, said second passageway extending between said pair of faces and in open communication with the other end of said first passageway to receive the other end of said rod therein;
   said rod having an arcuate cutout formed therein adjacent said other end thereof, said arcuate cutout being in open communication with said second passageway;
   a passage formed in said housing, said passage having a pair of opposed ends of which one end is in open communication with said second passageway, the other end of said passage opening into said centrally located opening;
   an elongated substantially cylindrical element having ends journalled for rotation in said second passage- way and a central cam surface engageable with said arcuate cutout whereby rotation of said element in one direction engages said cam surface with said arcuate cutout to move said rod in a direction inwardly of said housing to draw said lug against said side of said groove to lock said ruler against axial movement relative to said housing, and rotation of said element in the reverse direction moves said rod in a direction out of said housing to disengage said lug from said side of said groove to thereby free said ruler for axial movement relative to said housing; handle means having opposed ends, one end of said handle means being connected on said element; and the other end of said handle means extending through said passage into said central opening for manual manipulation to effect rotation of said element.

2. A carpenter's tool as defined in claim 1 wherein one wall of said second pair of walls is perpendicular to the longitudinal axis of said ruler; and said first pair of walls extend perpendicular to said one wall of said second pair of walls.

3. A carpenter's tool as defined in claim 2 and bubble level means mounted on said housing adjacent said one wall of said second pair of walls and adjacent the second wall of said first pair of walls and cooperating therewith to indicate angle of inclination of said second wall of said first pair of walls.

4. A carpenter's tool as defined in claim 3 and tape measuring means disposed in said housing and having an end thereof extendable through the other wall of said second pair of walls to increase the effective linear measuring length of said ruler.

5. A carpenter's tool as defined in claim 3 and a protuberance formed on said ruler and projecting laterally from a side thereof adjacent one of its ends, said protuberance being adapted to scribe a mark on deformable material.

6. A carpenter's tool as defined in claim 5 and said ruler having an opening extending transversely therethrough adjacent its other end, and said last-named opening constituting the center of a circle scribed by said protuberance.

References Cited

UNITED STATES PATENTS

| | | | |
|---|---|---|---|
| 694,774 | 3/1902 | Muehlberg | 33—95 X |
| 715,703 | 12/1902 | Starrett | 33—103 |
| 1,015,536 | 1/1912 | Blackwell | 33—103 X |
| 1,498,896 | 6/1924 | Van de Veire | 33—102 X |
| 1,690,919 | 11/1928 | Baine | 33—95 |
| 2,025,473 | 12/1935 | Plumb | 33—102 |
| 2,404,911 | 7/1946 | King | 33—103 |
| 3,008,238 | 11/1961 | Ford | 33—138 X |
| 3,041,004 | 6/1962 | Busch | 33—138 X |
| 3,089,245 | 5/1963 | Cromer et al. | 33—102 X |

FOREIGN PATENTS

| | | |
|---|---|---|
| 1,120,124 | 4/1956 | France. |
| 84,646 | 8/1920 | Switzerland. |

LEONARD FORMAN, *Primary Examiner.*

HARRY N. HAROIAN, *Examiner.*